United States Patent
Ichikawa et al.

(10) Patent No.: US 6,504,473 B2
(45) Date of Patent: Jan. 7, 2003

(54) VEHICLE TRAVEL SAFETY APPARATUS

(75) Inventors: Shoji Ichikawa, Wako (JP); Yoshihiro Urai, Wako (JP); Kenji Kodaka, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/884,118

(22) Filed: Jun. 20, 2001

(65) Prior Publication Data

US 2001/0054956 A1 Dec. 27, 2001

(30) Foreign Application Priority Data

Jun. 21, 2000 (JP) ............................... 200-186719

(51) Int. Cl.[7] .................................................. B60Q 1/00
(52) U.S. Cl. ...................... 340/435; 340/436; 340/903; 701/70; 701/72; 701/301
(58) Field of Search .................. 340/435, 436, 340/903; 701/70, 72, 300, 301

(56) References Cited

U.S. PATENT DOCUMENTS

| | | | | |
|---|---|---|---|---|
| 5,420,792 A | * | 5/1995 | Butsuen et al. | ............. 340/903 |
| 5,473,538 A | * | 12/1995 | Fujita et al. | ................. 701/301 |
| 5,680,097 A | * | 10/1997 | Uemura et al. | ............. 340/435 |
| 5,745,870 A | * | 4/1998 | Yamamoto et al. | ......... 340/436 |
| 6,275,772 B1 | * | 8/2001 | Sugimoto et al. | ........... 340/436 |
| 6,317,692 B2 | * | 11/2001 | Kodaka et al. | ............. 340/435 |

* cited by examiner

Primary Examiner—Daniel J. Wu
(74) Attorney, Agent, or Firm—Arent Fox Kintner Plotkin & Kahn, PLLC

(57) ABSTRACT

When a turning state of a subject vehicle is detected, the action timing of the contact avoidance support device is slower than when the turning state is not detected. When an action timing determining part 22 estimates that there is the possibility of the subject vehicle coming into contact with the vehicle in front and a turning state of the subject vehicle is detected based on the output from a transversal acceleration sensor S4, a changing rate of the steering angle sensor S5, and a yaw rate sensor S3, a compensation interval calculating part 23 calculates a compensation interval depending on the size of the detected turning state (the amount of the steering angle, the changing rate of the steering angle, and the transversal acceleration). The action timing of the brake actuator 12 is slowed by this compensation interval.

8 Claims, 4 Drawing Sheets

VEHICLE TRAVEL SAFETY APPARATUS

BACKGROUND OF THE INVENTION

1. Field of the Invention

The present invention is related to a vehicle travel safety apparatus for avoiding contact with a object based on the relationship of the relative positions of a vehicle detected ahead of the subject vehicle by a object detection apparatus such as a laser radar.

2. Description of Related Art

Conventionally, as disclosed in Japanese Unexamined Patent Application, First Publication, No. Hei 8-240660 and Japanese Unexamined Patent Application, First Publication, No. Hei 6-160510, for example, a vehicle travel safety apparatus is known in which electromagnetic radiation such as a laser is emitted towards a vehicle traveling forward ahead of the subject vehicle, and based on the result or the detection of the radar that receives the reflected wave from the object of the vehicle and the like positioned in front of the subject vehicle, detects an obstacle traveling forward in front of the subject vehicle, and based on the result of this detection generates an warning that brings about, for example, an avoidance operation by the driver based on the results of this detection, or automatically carries out a controlling action to avoid contact with the obstacle.

In addition, among a travel safety apparatus of this type, apparatuses are known that carry out the operation of warning about a collision avoidance taking into account the speed of the subject vehicle, the path of the subject vehicle, the relative distance from the obstacle, the relative speeds, the relative angles and the like.

However, in the conventional vehicle travel safety apparatus, it cannot always be said that the elements of the condition of the driver are sufficiently reflected in the operation control of the travel safety apparatus, and thus, actually, there are cases in which warnings and collision avoidance control are carried out even in a situation where the driver is steering in advance to avoid an obstacle such as a vehicle in front. Thereby, the operation * of the travel safety apparatus may be complicated for the driver, and unnecessary avoidance actions may occur for an obstacle that presents no danger, thus inviting deterioration of the drivability.

For example, a situation in which a driver is momentarily distracted for about one .second for a safety check or speed check can certainly occur during normal driving, and in this type of situation, there are many times that the vehicle is traveling almost perfectly straight. In addition, at this time, the steering angle operated by the driver is small, the change of the steering angle is low, and the transversal acceleration of the vehicle is low. In such a situation, when the vehicle travel safety apparatus determines that the collision danger is high, preferably warnings and collision avoidance control is rapidly executed.

In contrast, when a steering operation is carried out that is of a degree for cornering the vehicle or changing lanes, etc., generally because the driver is driving while paying sufficient attention, and thus in this situation when warnings and collision avoidance control is carried out by the vehicle travel safety apparatus at the same timing as in the situation of the momentary distraction mentioned above, not only is this complicated for the driver, but there may be a sense that the drivability has deteriorated.

SUMMARY OF THE INVENTION

In consideration of the conventional problems described above, it is an object of the present invention to provide a vehicle travel safety apparatus that can improve drivability by modifying the avoidance action timing when the turning of the vehicle is detected.

In consideration of the above problems, in a first aspect of the present invention in it is an object of the present invention to provide a vehicle travel safety apparatus (for example, the travel safety apparatus 10 in the embodiment described below) providing a object detecting device (for example, the radar apparatus S1 in the present embodiment described below) that detects a object in front of the subject vehicle (for example, the forward moving vehicle V11 in the embodiment described below), a relative velocity calculating device (for example, the radar apparatus S1 in the embodiment described below) that finds the relative velocity between the subject vehicle (for example, the subject vehicle V10 in the embodiment described below) based on the result of the detection of the object detecting device, a contact possibility estimating device (for example, the action timing determining part 22 in the embodiment described below) that estimates the possibility that the object and the subject vehicle will come into contact based on the result of the calculation of the relative velocity calculating device, and a contact avoidance support device (for example, the brake actuator 12 and the warning apparatus 17 in the embodiment described below) that automatically acts in a predetermined interval before contact when it is estimated that there is the possibility of contact by the contact possibility estimation device, and supports contact avoidance between the object and the subject vehicle, wherein a turning state detecting device (for example, the yaw rate sensor S3, the transversal acceleration sensor S4, and the steering angle sensor S5 in the embodiment described above) that detects the turning state of the subject vehicle, and a compensating device (for example, the steps S1 to S11 in the embodiment described below) that compensates the predetermined interval when a turning state of the subject vehicle is detected by the turning state detecting device.

Due to this type of structure, when it is estimated that there is the possibility that the subject vehicle may contact a object such as a vehicle in front and when the turning state of the subject vehicle is detected, the action timing of the contact avoidance support device can be compensated, and action control of the travel safety apparatus taking into account the elements of the state of the driver is possible.

In addition, according to a second aspect of the invention, in the invention according to the first aspect, the compensation device is characterized in slowing the predetermined interval. Due to this type of structure, when turning state is detected, the action of the contact avoidance support device can be made slower than when a turning state is not detected.

In addition, according to a third aspect of the invention, in the invention according to the first and second aspects, the turning state detecting device is characterized in detecting the steering angle due to the operation of the driver. Due to this type of structure, compensating the predetermined interval described above depending on the size of the amount of the steering angle is possible.

In addition, according to a fourth aspect of the invention, in the invention according to any of the first through third aspects, the turning state detecting device is characterized in detecting the changing rate of the steering angle due to the operation of the driver. Due to this type of structure, in the case that the steering angle and the changing rate of the steering angle are both detected by the turning state detection device, the detection of the turning state can be carried out more precisely and the compensation of the action timing of the contact avoidance support device can be more precise.

In addition, according to a fifth aspect of the invention, in the invention according to any of the first through fourth aspects, the turning state detecting device is characterized in detecting the transversal acceleration of the subject vehicle. Due to having this type of structure, in the case that the transversal acceleration and the steering angle or the transversal acceleration and the changing rate of the steering angle velocity, or the transversal acceleration and the steering angle and the changing rate of the steering angle are detected by the turning state detection device, the detection of the turning state can be more precise and the action timing of the contact avoidance support device can be more precisely compensated.

In addition, according to a sixth aspect of the invention, in the invention according to the first and second aspects, the turning state detecting device is characterized in detecting at least two among the steering angle, the changing rate of the steering angle, and the transversal acceleration of the subject vehicle, and compensates the predetermined interval by selecting the largest among the plurality of compensation amounts found by the turning state detecting device. Due to having this type of structure, the turning state can be detected more precisely and the action timing of the contact avoidance support device can be compensated more precisely.

In addition, according to a seventh aspect of the invention, in the invention according to any of the first through sixth aspects, the contact avoidance support device is characterized in being a vehicle control system. Due to having this type of structure, contact avoidance can be reliably carried out without depending on the operations of the driver.

In addition, according to an eighth aspect of the invention, in the invention according to any of the first through seventh aspects, the contact avoidance support device is a notification device provided in the vehicle. Due to having this type of structure, the attention of the driver can be alerted so that he or she will carry out the procedures for contact avoidance.

DETAILED DESCRIPTION OF THE INVENTION

Figure 1:
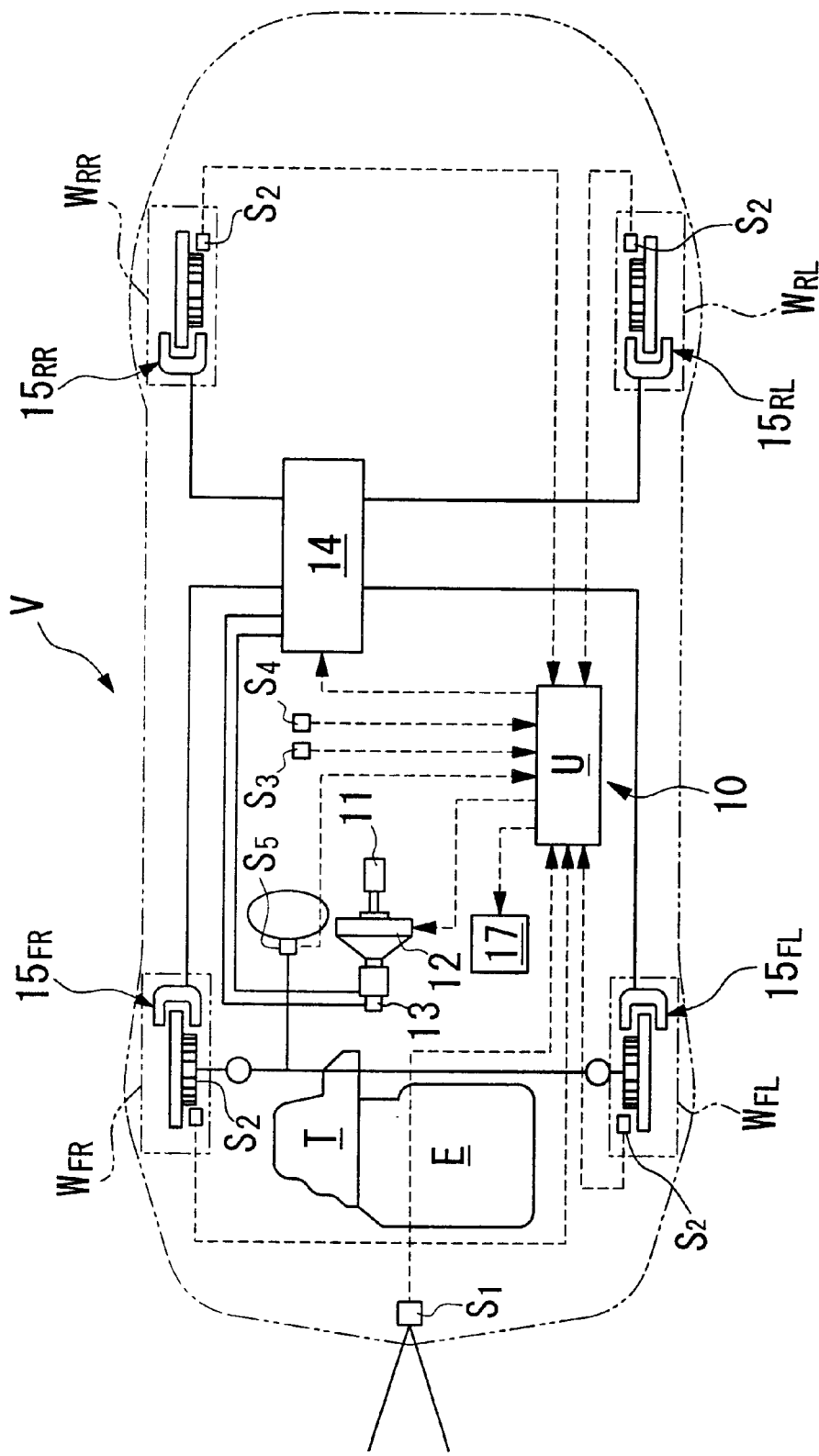
FIG. 1 is a complete diagram showing the structure of a vehicle travel safety apparatus device according to an embodiment of the present invention.
Figure 2:
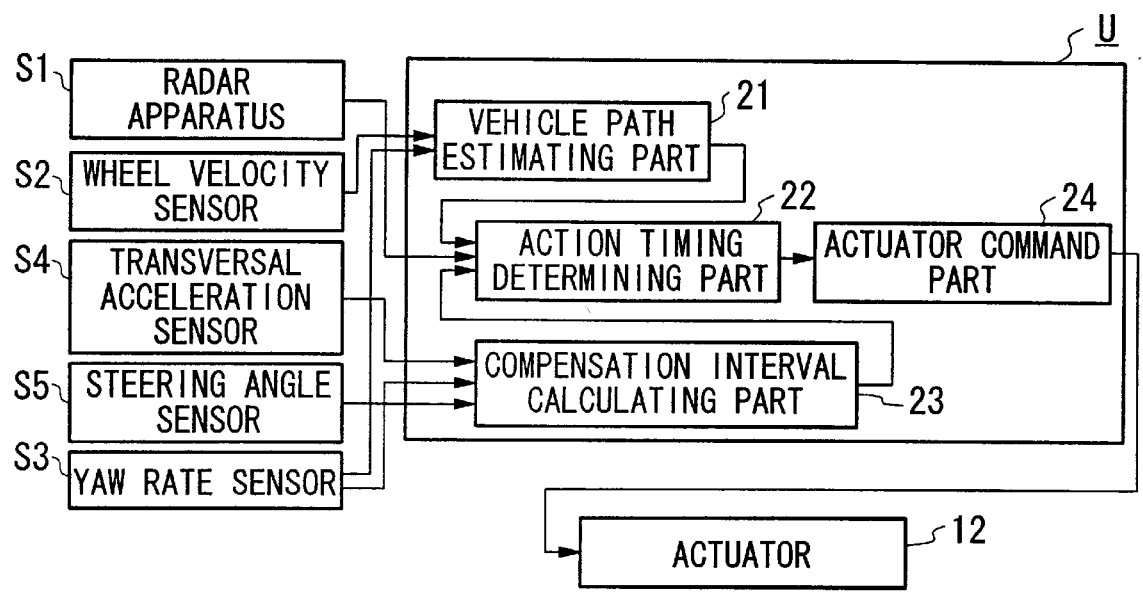
FIG. 2 is a functional block diagram showing the vehicle travel safety apparatus according to the present invention.

Below, a vehicle travel safety apparatus according to the present embodiments will be explained referring to the figures. FIG. 1 is a complete structural diagram of the vehicle V having the vehicle travel safety apparatus 10 according to the embodiments of the present invention installed, and FIG. 2 is a functional block diagram of the travel safety apparatus 10 shown in FIG. 1.

As shown in FIG. 1, the vehicle V having installed the vehicle travel safety apparatus 10 according to this embodiment provides left and right front wheels WFR and WFR, which are the driving wheels to which the drive power of the engine E is transmitted via the transmission T, and the driven left and right rear wheels WRR and WRL.

The brake pedal 11 operated by the driver is connected to the master cylinder 13 via the brake actuator 12 that comprises an electric control negative pressure booster.

The brake actuator 12 drives the master cylinder 13 by mechanically doubling the leg power of the brake pedal 11, and at the same time operates the master cylinder 13 by a signal from the electrical control unit U independently of the operation of the brake pedal 11 during automatic control. Moreover, the input rod of the brake actuator 12 is connected to the brake pedal 11 via a lost motion mechanism, and even when the input rod is moved forward due to the brake actuator 12 being activated by a signal from the electric control unit U, the brake pedal 11 remains at the initial position.

The master cylinder 13 is connected to the brake calipers 15FR, 15FL, 15RR, and 15RL respectively provided on the front wheels WFR and WFL and the rear wheels WRR and WRL via the pressure adjuster 14. The pressure adjuster 14 will carry out antilock brake control to suppress locking of the vehicle's wheels, and the oil pressures in the brakes transmitted to the front wheels WFR and WRL and the rear wheels WRR and WRL by a signal from the electric control unit U are separately controlled.

In the electric control unit U, a radar apparatus S1 that transmits an electromagnetic wave such as a laser or millimeter wave in the forward direction of the vehicle body, and detects the relative distance and the relative speed between the body of the car in front and the subject vehicle based on the reflected wave, vehicle wheel velocity sensors S2, . . . , S2 that respectively detect the number of rotations of the front wheels WFR and WFL and the rear wheels WRR and WRL, the yaw rate sensor S3 that detects the turning of the vehicle V, the transversal acceleration sensor S4 that detects the transversal acceleration of the vehicle V, a steering angle sensor S5 that detects the steering angle due to the steering operation of the driver are connected. Moreover, the radar apparatus S1 realizes the object detection device and the relative speed calculation device in the present invention, and the yaw rate sensor S3, the transversal acceleration sensor S4, and the steering angle sensor S5 each realize the turning state detection device in the present invention.

The electric control unit U controls the operation of the brake actuator 12 and the pressure adjustor 14 based on signals from the radar apparatus S1 and each of the sensors S2 to S5, and at the same time, controls the action of the warning apparatus 17 comprising a speaker, lamp and the like. Moreover, the brake actuator 12 and the warning apparatus 17 each realize the contact avoidance support device in the present invention.

In addition, as shown in FIG. 2, the electric control unit U comprises a vehicle path estimating part 21, an action timing determining part 22, a compensation time calculating part 23, and an actuator command part 24.

The signal for the vehicle velocity output from the vehicle wheel velocity sensor S2 and the signal for the turning of the vehicle V output from the yaw rate sensor S3 are input into the vehicle path estimating part 21, and this vehicle path estimating part 21 estimates that path on which the vehicle will advance in the future.

The signal for the turning of the vehicle output from the yaw rate sensor S3, the signal for the transversal acceleration output from the transversal acceleration sensor S4, and the signal for the steering angle output from the steering angle sensor S5 are input into the compensation time calculating part 23, and this compensation time calculating part 23 calculates the amount of compensation of the action timing interval based on the information from these sensors S3 to S5.

The action timing determining part 22 estimates the collision danger based on the relative distance and the relative speed between a physical object such as a vehicle in front and the subject vehicle, the speed of the subject vehicle, and information from the vehicle path estimating part 21 and the compensation time calculating part 23, and determines the action timing. Moreover, the action timing determining part 22 realizes the contact possibility estimating device in the present invention.

The actuator command part 24 commands the brake actuator 12 with the actuator output.

In the vehicle travel safety apparatus 10 structured as described in FIG. 2, when the turning state of the vehicle is detected, the execution timing of the contact avoidance processing (warning processing and vehicle control processing) is modified depending on the size of this turning state. When the driver is paying sufficient attention during steering, for example, as described above, the execution timing of the contact avoidance processing slower than during the momentary distraction so that unnecessary contact avoidance action is not taken, and at the same time, drivability is improved.

When a turning state of a subject vehicle is detected, the action timing of the contact avoidance support device is slower than when the turning state is not detected. When an action timing determining part 22 estimates that there is the possibility of the subject vehicle coming into contact with the vehicle in front and a turning state of the subject vehicle is detected based on the output from a transversal acceleration sensor S4, a steering angle changing rate sensor S5, and a yaw rate sensor S3, a compensation interval calculating part 23 calculates a compensation interval depending on the size of the detected turning state (the amount of the steering angle, the changing rate of the steering angle, and the transversal acceleration). And the action timing of the brake actuator 12 is slowed by this compensation interval.

Figure 3:
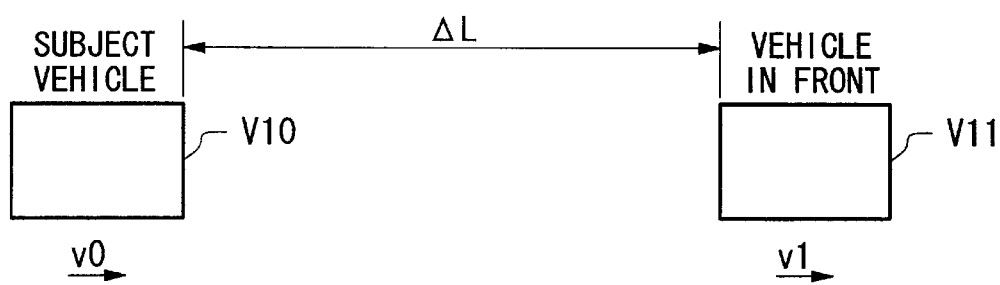
FIG. 3 is a diagram showing the relative positional relationship between the subject vehicle and another travel vehicle.

Below, the compensation of the execution timing will be explained using the contact avoidance processing employing the warning apparatus 17. First, the normal execution timing of the warning apparatus 17 will be explained referring to FIG. 3.

Here, where the speed of the vehicle 10 is V0 (m/s), the speed of the vehicle in front V11 is V1 (m/s), and the relative distance is ΔL (m), the electronic control unit U calculates the necessary time (hereinafter referred to as the headway time) Th (sec) for the vehicle 10 to arrive at the vehicle V11 in front based on the relative relationships between the relative distance ΔL and relative speed ΔV (ΔV=V0−V1) detected by the radar apparatus S1. In addition, normally the operation of the warning apparatus 17 is controlled using the time in which this headway time becomes equal to or less than the action timing interval Ta (for example, 2 or 3 seconds) that is set in advance as an action timing.

In contrast, in the case that the turning state is detected, the action timing interval Ta is compensated depending on the size of this turning state, and control is carried out such that the action timing is slower than normal.

In this embodiment, the amount of the steering angle, the changing rate of the steering angle, and the transversal acceleration due to the operation of the driver are used as elements for detecting the turning state. In addition, based on these respective elements, the compensation with respect to the action timing interval Ta is calculated, the largest compensation amount DT among these is used, and the action timing interval Tar after compensation is calculated (Tar=Ta−DT).

Figure 4:
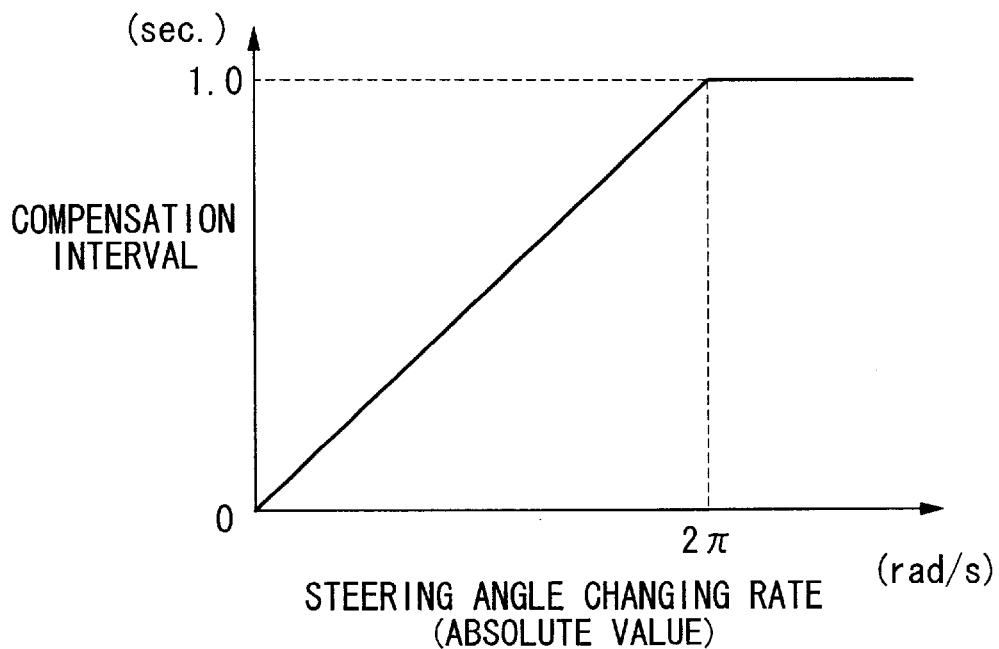
FIG. 4 is a diagram showing an example of the map illustrating the relationship between the changing rate of the steering angle and the correction time of the vehicle travel safety apparatus according to an embodiment of the present embodiment.

First, in the case that the compensation amount DTdθ of the action timing interval Ta is calculated from the changing rate of the steering angle, the electronic control unit calculates the changing rate of the steering angle Δθ (rad/sec) from the amount of the steering angle θ detected by the steering angle sensor S5, and based on the absolute value of the calculated steering angle changing rate Δθ, the compensation amount DTdθ is calculated referring to the steering angle changing rate/compensation time map. FIG. 4 is an example of the steering angle changing rate/compensation time map, and the compensation amount DTdθ is set so as to increase as a first order function in accordance with the increase in the absolute value of the changing rate of the steering angle Δθ, and the upper limiting value is set to 1.0 (sec). In the map shown in FIG. 4, for example, the compensation amount when the changing rate of the steering angle Δθ=π(rad/sec) is DTdθ=0.5 (sec).

Figure 5:
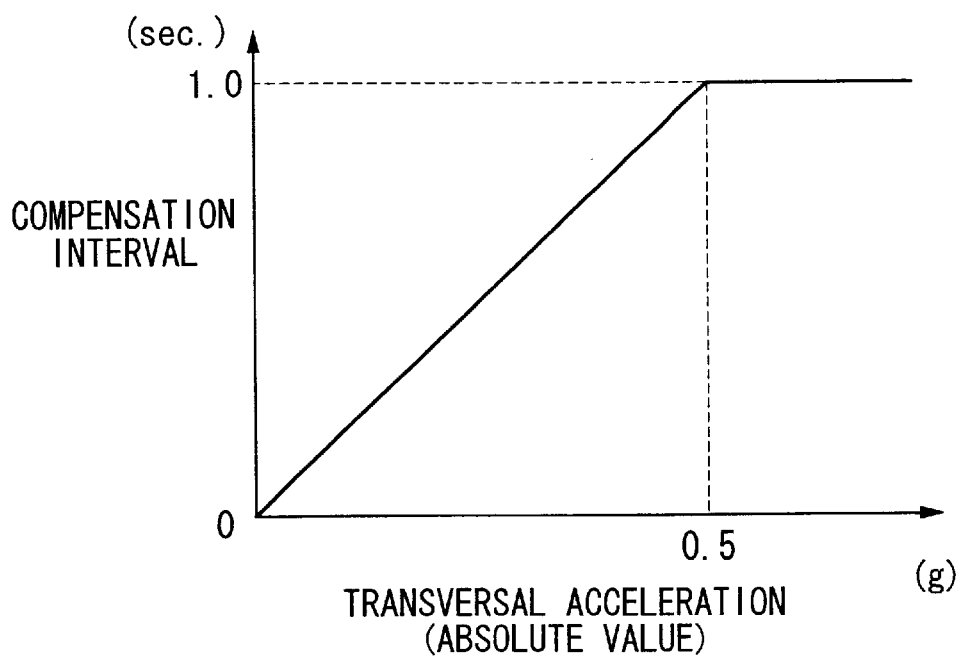
FIG. 5 is a diagram showing an example of the map illustrating the relationship between the transverse acceleration and the correction time of the vehicle travel safety apparatus according to an embodiment of the present embodiment.

In addition, in the case that the compensation amount DTyG of the action timing interval Ta is calculated from the transversal acceleration, the electronic control unit U calculates the compensation amount DTyG referring to the transversal acceleration/compensation time map based on the absolute value of the transversal acceleration Yg (m/sec$^2$) detected by the transversal acceleration sensor S4. FIG. 5 is an example of a transversal acceleration/compensation time map, and the compensation amount DTyG is set so as to increase as a first order function according to the increase in transversal acceleration Yg, and the upper limit value is set to 1.0 (sec). In the map shown in FIG. 5, for example, the compensation amount when the transversal acceleration Yg=0.5 (sec) is DTyG=1.0 (sec).

Moreover, the following relationship holds between the transversal acceleration Yg (m/sec$^2$) and the vehicle speed V (m/s) and the cornering radius R(m):

$$Yg = V \times V / R \qquad (1)$$

In addition, because the relationship between the amount of the steering angle θ (rad) and the cornering radius R(m) is an inverse proportion, Eq. 1 can be represented by the following equation:

$$Yg \propto \theta \times V \times V \qquad (2)$$

In addition, by setting the constant α such that the relationship between the amount of the steering angle θ and the compensation time is the same as the relationship between the transversal acceleration Yg and the compensation time, the relationship between the amount of the steering angle θ and the compensation time (the compensation amount DTθ) can be represented by the following equation:

$$DT\theta = \theta \times V \times V \times \alpha \qquad (3)$$

Using this equation, the electronic control unit U calculates the compensation amount DTθ of the action timing interval Ta from Eq. 3 based on the amount of the steering angle θ detected by the steering angle sensor S5. Moreover, in this case, the upper limit value of the compensation amount DTθ is set to 1.0 (sec).

Additionally, in this embodiment, the compensation amount DTθ calculated based on the amount of the steering angle θ, the compensation amount DTdθ calculated based on the steering angle changing rate Δθ, and the compensation amount DTyG calculated based on the transversal acceleration Yg are compared, and using the largest compensation amount among these, the action timing interval Tar after compensation is calculated from the above equations, and the operation of the warning apparatus 17 is controlled using the time in which the above described headway time Th becomes equal to or less than the action timing interval Tar after compensation as the action timing.

According to the travel safety apparatus 10 of the present invention, when it is estimated that there is the possibility that the vehicle V10 will contact the object such as the vehicle in front V11 and the turning state of the vehicle is detected, the action timing of the warning apparatus can be compensated so as to slow down depending on the size of this turning state, and thus when the driver is driving by steering while paying sufficient attention, such as during cornering or while changing lanes, discomfort in driving contributed by unnecessary activation of the warning apparatus 17 can be prevented, the warning apparatus 17 can be activated only when a warning is actually necessary, and the precision of the execution of the warning apparatus 17 and the drivability improve.

In the travel safety apparatus 10 according to the present embodiment, the compensation amounts DTθ, DTdθ, and DTyG are respectively calculated based on the three turning state detection elements, the amount of the steering angle θ, the changing rate of the steering angle Δθ, and the transversal acceleration Yg, and using the largest compensation amount among these, the action timing of the warning apparatus 17 is compensated so as to be slowest, and thus the execution precision of the warning apparatus 17 and the drivability are dramatically improved.

Figure 6:
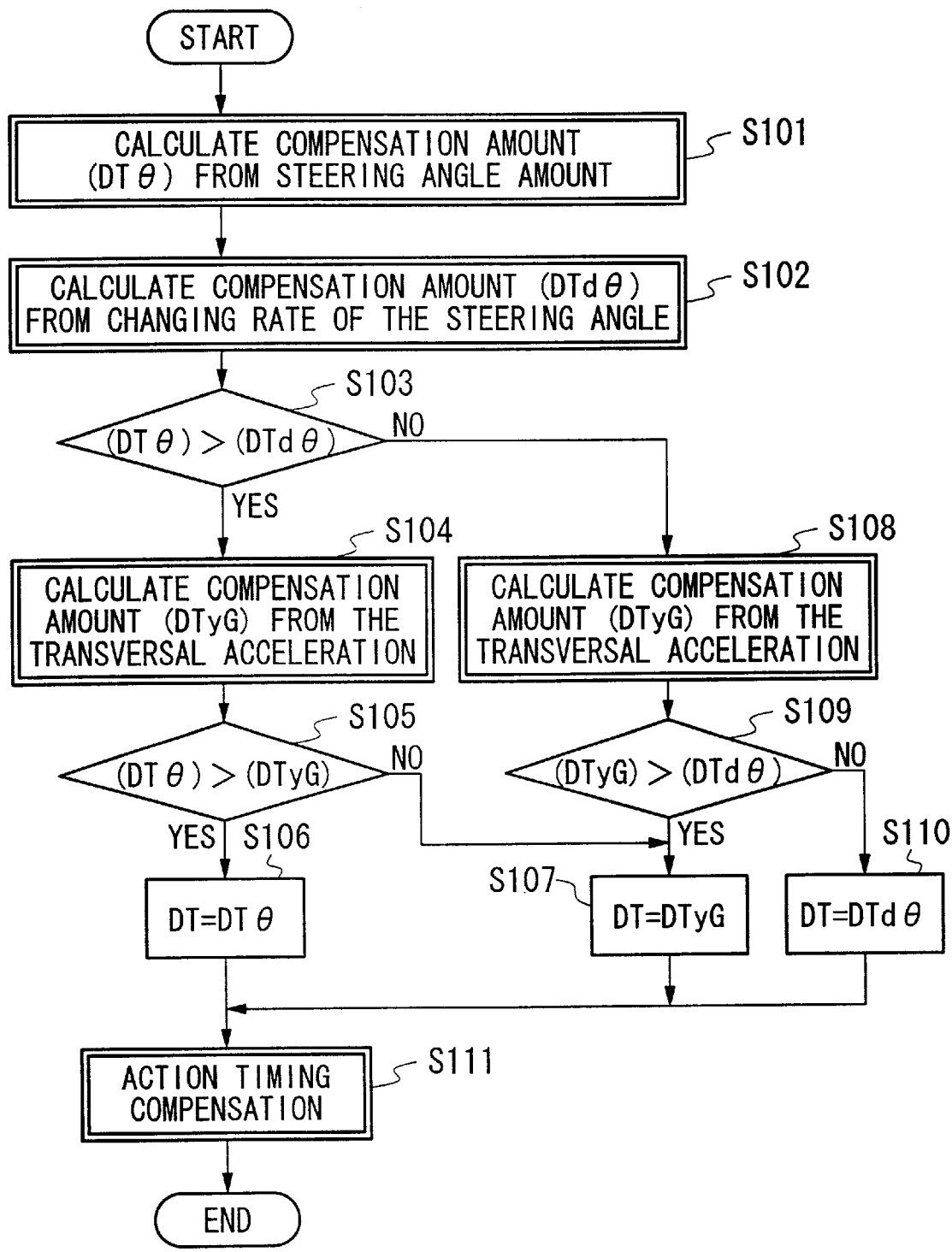
FIG. 6 is a flowchart showing the activation timing correction processing of the vehicle travel safety apparatus according to an embodiment of the present invention.

Next, the action timing compensation processing of the vehicle travel safety apparatus 10 in this embodiment will be explained referring to the flowchart in FIG. 6.

First, in step S101, the compensation amount DTθ is calculated using Eq. 3 based on the amount of the steering angle θ detected by the steering angle sensor S5.

Next, the flow proceeds to step S102, and the compensation amount DTdθ is calculated referring to the changing rate of the steering angle/compensation time map shown in FIG. 4 based on the steering angle changing rate Δθ.

Next, progressing to step S103, it is determined whether or not the compensation amount DTθ calculated based on the amount of the steering angle θ is larger than the compensation amount DTdθ calculated based on the steering angle changing rate Δθ.

In the case that the determination in step S103 is positive, the flow proceeds to step S 104, and the compensation amount DTyG is calculated referring to the transversal acceleration/compensation time map shown in FIG. 5 based on the transversal acceleration Yg detected by the transversal acceleration sensor S4.

Next, the flow proceeds to step S105, and it is determined whether or not the compensation amount DTθ calculated based on the amount of the steering angle θ is larger than the compensation amount DTyG calculated based on the transversal acceleration Yg. In the case that the determination in step S105 is positive, the flow proceeds to step S106, and the compensation amount DTθ calculated based on the amount of the steering angle θ will serve as the compensation amount DT. This is because as a result of comparing the three compensation amounts DTθ, DTdθ, and DTyG, compensation amount DTθ is determined to be the largest.

In contrast, in the case that the determination in step S105 is negative, the flow proceeds to step S107, and the compensation amount DTyG calculated based on the transversal acceleration Yg will serve as the compensation amount DT. This is because as a result of comparing the three compensation amounts DTθ, DTdθ, and DTyG, compensation amount DTyG is determined to be the largest.

In contrast, in the case that the determination in step S103 is negative, the processing proceeds to step S108, and the compensation amount DTyG is calculated referring to the transversal acceleration/compensation time map shown in FIG. 5 based on the transversal acceleration Yg detected by the transversal acceleration sensor S4.

Next, the flow proceeds to step S109, and it is determined whether or not the compensation amount DTyG calculated based on the transversal acceleration Yg is larger than the compensation amount DTdθ calculated based on the changing rate of the steering angle steering angle changing rate Δθ. In the case that the determination in step S109 is positive, the flow proceeds to step S107, and the compensation amount DTyG calculated based on the transversal acceleration Yg will serve as the compensation amount DT. This is because as a result of comparing the three compensation amounts DTθ, DTdθ, and DTyG, the compensation amount DTyG is determined to be the largest.

In contrast, in the case that the determination in step S109 is negative, the flow proceeds to step S110, and the compensation amount DTdθ calculated based on the changing rate of the steering angle Δθ will serve as the compensation amount DT. This is because as a result of comparing the three compensation amounts DTθ, DTdθ, and DTyG, the compensation amount DTdθ is determined to be the largest.

After each of step S106, step S107, and step S110, the flow proceeds to step S111, the action timing interval Tar after compensation is calculated (Tar=Ta−DT), and the present routine stops for the time being.

Moreover, the vehicle travel safety apparatus according to the present invention is not limited to the embodiment described above, and for example, the transversal acceleration can be calculated from the subject vehicle speed and the yaw rate of the subject vehicle.

In addition, in the embodiment described above, the action timing interval Ta of the warning apparatus 17 was explained as an example, but the same compensation control is possible for the action timing interval Tb of the brake actuator 12. In this case, in the case that action timings Ta and Tb are compensated, the action timing interval Ta of the warning apparatus 17 can be set equal to or greater than the action timing interval Tb of the brake actuator 12 (Ta≧Tb). Thereby, the attention of the driver can be alerted by the warning apparatus 17, and in the case that in spite of this the possibility of contact cannot be avoided, the contact avoidance can be carried out by automatic control.

In addition, in the embodiment described above, three elements for detecting the revolution condition were used: the amount of the steering angle, the changing rate of the steering angle, and the transversal acceleration, and from among the compensation amounts DT calculated based on each of these elements, the largest compensation amount DT was found, and based on this compensation value, the action timing interval is compensated. However, as elements for detecting the rotation state, among the three elements, two elements (the amount of the steering angle and the changing rate of the steering angle or the amount of the steering angle and the transversal acceleration or the changing rate of the steering angle and the transversal acceleration) can be used, and the action timing interval calculated using the largest among the compensation values DT calculated based on each of the two elements as the compensation amount DT. Alternatively, as elements for detecting the rotation state, among the three elements, one element can be used, and the action timing interval compensated using the compensation amount DT calculated based on this element.

In addition, in the embodiment described above, as a brake actuator, the electric control negative pressure booster was used, but this is not limited thereby, and for example, an electromagnetic proportional valve can be provided.

As explained above, according to a first aspect of the present invention, when it is estimated that there is the possibility that the subject vehicle may contact a object such as a vehicle in front, the turning state of the subject vehicle is detected, and the action timing of the contact avoidance support device can be compensated, action control of the travel safety apparatus taking into account the elements of the state of the driver is possible, and thus there is the effect that the contact avoidance can be made more effective.

According to a second aspect of the invention, when a turning state is detected, the action of the contact avoidance support device can be made slower than when a turning state is not detected, and thus when the driver is driving by steering while paying sufficient attention, unnecessary activation of the contact avoidance support device can be prevented, which device that there are the effects that the precision of the execution of the contact avoidance can be increased and the drivability can be improved.

According to a third aspect of the invention, compensating the predetermined interval described above depending on the size of the amount of the steering angle is possible, and thus there is the effect that the contact avoidance can be made more effective.

According to the fourth aspect of the invention, compensation of a predetermined interval depending on the size of the steering angle change is possible, and thus there is the effect that the contact avoidance can be made more effective. In particular, in the case that the steering angle and the changing rate of the steering angle are both detected by the turning state detection device, the detection of the turning state can be carried out more precisely and the compensation of the action timing of the contact avoidance support device can be more precise, and thus there are the effects that the precision of the execution of the contact avoidance can be increased and the drivability further improved.

According to a fifth aspect of the invention, compensation of a predetermined interval depending on the size of the transversal acceleration is possible, and thus there is the effect that the contact avoidance can be made more effective. In particular, in the case that the transversal acceleration and the steering angle or the transversal acceleration and the steering angle changing rate, or the transversal acceleration and the steering angle and the steering angle changing rate are detected by the turning state detection device, the detection of the turning state can be more precise, and thus there are the effects that the precision of the execution of the contact avoidance can be increased and the drivability further improved.

According to a sixth aspect of the invention, the turning state can be detected more precisely and the action timing of the contact avoidance support device can be compensated more precisely, and thus the precision of execution of the contact avoidance can be further increased and the drivability can be further improved.

According to a seventh aspect of the invention, contact avoidance can be reliably carried out without depending on the driving operations, and thus there is the effect that the safety is increased.

According to an eighth aspect of the invention, there is the effect that the attention of the driver can be attracted such that he or she carries out the procedures for contact avoidance.

What is claimed is:

1. A vehicle travel safety apparatus providing a object detecting device that detects an object in front of the subject vehicle, a relative velocity calculating device that finds the relative velocity between the subject vehicle and the object based on the result of the detection of said object detecting device, a contact possibility estimating device that estimates the possibility that said object and the subject vehicle will come into contact based on the result of the calculation of said relative velocity calculating device, and a contact avoidance support device that automatically acts in a predetermined interval before contact when it is estimated that there is the possibility of contact by said contact possibility estimation device, and supports contact avoidance between said object and the subject vehicle, wherein said vehicle travel safety apparatus provides:

a turning state detecting device that detects the turning state of the subject vehicle, and a compensating device that compensates said predetermined interval when a turning state of the subject vehicle is detected by said turning state detecting device.

2. A vehicle travel safety apparatus according to claim 1 wherein said compensation device slows said predetermined interval.

3. A vehicle travel safety apparatus according to claim 1 wherein said turning state detecting device detects a steering angle of the steering due to the operation of the driver.

4. A vehicle travel safety apparatus according to claim 1 wherein said turning state detecting device detects a changing rate of the steering angle of the steering due to the operation of the driver.

5. A vehicle travel safety apparatus according to claim 1 wherein said turning state detecting device detects the transversal acceleration of the subject vehicle.

6. A vehicle travel safety apparatus according to claim 1 wherein said turning state detecting device detects at least two among the steering angle, the steering angle changing rate, and the transversal acceleration of the subject vehicle, and said compensation device compensates said predetermined interval by selecting the largest among compensation amounts of said predetermined interval detected by said turning state detecting device.

7. A vehicle travel safety apparatus according to claim 1 wherein said contact avoidance support device is a vehicle brake system.

8. A vehicle travel safety apparatus according to claim 1 wherein said contact avoidance support device is a notification device provided in the vehicle.

* * * * *

UNITED STATES PATENT AND TRADEMARK OFFICE
CERTIFICATE OF CORRECTION

PATENT NO.   : 6,504,473 B2
DATED        : January 7, 2003
INVENTOR(S)  : Ichikawa et al.

It is certified that error appears in the above-identified patent and that said Letters Patent is hereby corrected as shown below:

<u>Title page,</u>
Item [30], please correct the Foreign Application Priority Data from "200-186719" to -- 2000-186719 --.

Signed and Sealed this

Twenty-fourth Day of June, 2003

JAMES E. ROGAN
*Director of the United States Patent and Trademark Office*